United States Patent
Knieriem et al.

(10) Patent No.: US 6,827,488 B2
(45) Date of Patent: Dec. 7, 2004

(54) SEALED PROBE CHAMBER FOR THERMOMETRY APPARATUS

(75) Inventors: Alan S. Knieriem, Baldwinsville, NY (US); David E. Quinn, Weedsport, NY (US); Thaddeus J. Wawro, Auburn, NY (US); John Lane, Weedsport, NY (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 0 days.

(21) Appl. No.: 10/379,276

(22) Filed: Mar. 4, 2003

(65) Prior Publication Data

US 2004/0071188 A1 Apr. 15, 2004

Related U.S. Application Data

(63) Continuation-in-part of application No. 10/268,844, filed on Oct. 10, 2002, now abandoned.

(51) Int. Cl.$^7$ .............................................. G01K 1/08
(52) U.S. Cl. ..................... 374/209; 374/158; 206/443; 600/549
(58) Field of Search ................................ 374/158, 208, 374/209; 600/549; 206/443, 306

(56) References Cited

U.S. PATENT DOCUMENTS

| | | | | |
|---|---|---|---|---|
| 3,217,544 A | * | 11/1965 | McElvenny ................. | 374/158 |
| 3,254,533 A | | 6/1966 | Tongret ...................... | 374/158 |
| 3,550,448 A | | 12/1970 | Ensign ........................ | 374/158 |
| 3,650,153 A | | 3/1972 | Schwab ....................... | 374/158 |
| 3,681,991 A | | 8/1972 | Ebertly, Jr. ................. | 374/158 |
| 4,007,832 A | | 2/1977 | Paull et al. ................. | 374/209 |
| 4,008,614 A | * | 2/1977 | Turner et al. .............. | 374/158 |
| 4,222,391 A | | 9/1980 | Rawson et al. ............. | 600/549 |
| 4,260,058 A | | 4/1981 | Paull et al. ................. | 206/443 |
| 4,446,967 A | * | 5/1984 | Halkyard .................... | 206/306 |
| 4,497,585 A | | 2/1985 | Paull et al. ................. | 374/158 |
| 4,572,365 A | | 2/1986 | Bruno et al. ................ | 374/209 |
| 4,619,271 A | * | 10/1986 | Burger et al. .............. | 600/549 |
| 4,649,027 A | | 3/1987 | Talbot | |
| 4,727,500 A | | 2/1988 | Jackson et al. ............ | 600/549 |
| 4,784,149 A | * | 11/1988 | Berman et al. ............ | 600/474 |
| 4,823,949 A | | 4/1989 | Bala ........................... | 374/158 |
| 5,494,046 A | * | 2/1996 | Cross ......................... | 600/595 |
| 5,632,555 A | | 5/1997 | Gregory et al. ............ | 374/102 |
| D395,609 S | | 6/1998 | Knieriem et al. .......... | D10/57 |
| 5,775,488 A | | 7/1998 | Vaught ....................... | 374/208 |
| 5,857,777 A | | 1/1999 | Schuh ......................... | 374/172 |
| 6,000,846 A | | 12/1999 | Gregory et al. ............ | 374/164 |
| 6,039,177 A | | 3/2000 | Swanson et al. .......... | 374/208 |
| 6,142,297 A | | 11/2000 | Price .......................... | 374/208 |
| 6,619,837 B2 | * | 9/2003 | Walls et al. ............... | 374/158 |
| 6,634,789 B2 | * | 10/2003 | Babkes ....................... | 374/208 |
| 2002/0172257 A1 | | 11/2002 | Walls et al. ............... | 374/158 |
| 2002/0181545 A1 | | 12/2002 | Babkes ....................... | 374/208 |
| 2003/0002562 A1 | | 1/2003 | Yerlikaya et al. .......... | 374/208 |
| 2003/0023398 A1 | | 1/2003 | Lantz et al. ................ | 702/130 |

FOREIGN PATENT DOCUMENTS

| | | | | |
|---|---|---|---|---|
| EP | | 0064127 A2 | * 11/1982 | ............ G01K/1/08 |
| FR | | 1379169 | 11/1964 | |

OTHER PUBLICATIONS

Hart Scientific, American Park, Utah, published copyright date of 1999, catalog excerpt, 3 pages, (no month).
Thermometrics catalog excerpt, published copyright date 1999, 7 pages, (no month).

* cited by examiner

Primary Examiner—Christopher W. Fulton
Assistant Examiner—Stanley J. Pruchnic, Jr.
(74) Attorney, Agent, or Firm—Wall Marjama & Bilinski LLP

(57) ABSTRACT

A temperature measuring apparatus includes a releasable probe chamber for housing a thermometry probe in which the chamber is isolated from the remainder of the thermometry apparatus. Preferably, the probe chamber is releasably attached to the apparatus and causes engagement or disengagement of at least one control switch of the apparatus depending on whether a probe is being removed or inserted into the probe chamber.

7 Claims, 5 Drawing Sheets

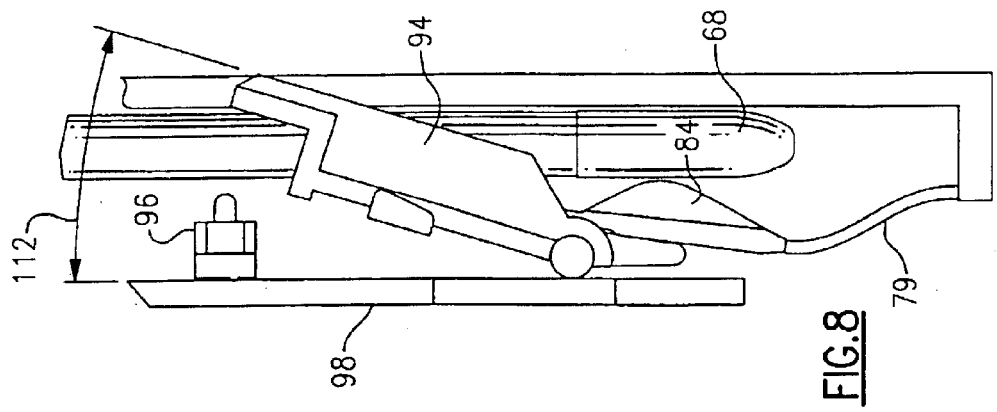
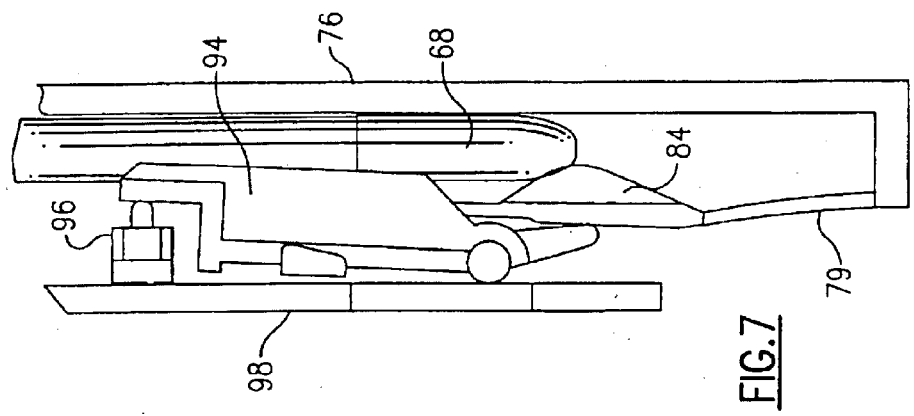
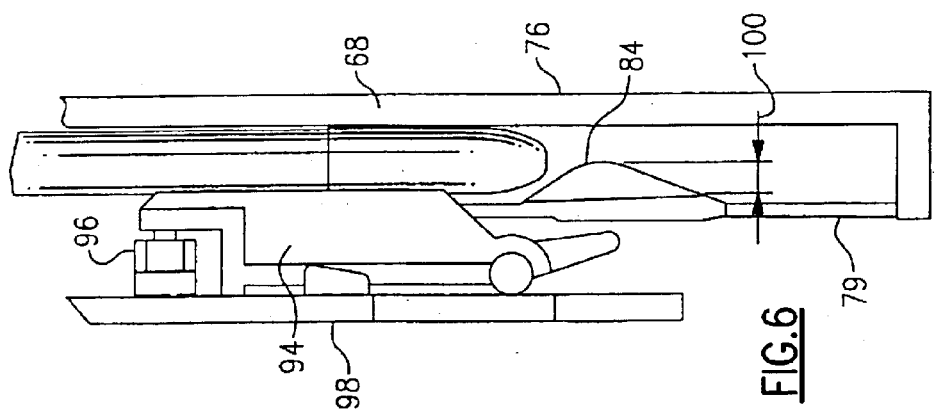

SEALED PROBE CHAMBER FOR THERMOMETRY APPARATUS

CROSS REFERENCE TO RELATED APPLICATION

This application is a continuation-in-part application of U.S. Ser. No. 10/268,844, now abandoned, entitled: SEALED PROBE CHAMBER FOR THERMOMETRY APPARATUS, filed Oct. 10, 2002.

FIELD OF THE INVENTION

This invention relates to the field of thermometry and more particularly to a removable probe chamber for a thermometer apparatus that houses an oral or rectal probe that is wholly isolated from the remainder of the thermometer housing.

BACKGROUND OF THE INVENTION

Electronic thermometry apparatus are prevalent in the health-care industry. These apparatus typically utilize a heat-sensitive probe connected to processing circuitry by means of at least one cable wherein the probe is stored in a sheath or well or other form of holder that is associated with a thermometer housing. In addition, the probes themselves are used with inexpensive, disposable plastic covers in which the probe is quickly inserted into a new probe cover just prior to taking a patient's temperature at a body site, such as the mouth or rectum. The probes themselves are often easily disconnected from the remainder of the thermometer and can be replaced in the event of malfunction or contamination.

Contamination of a thermometry probe is very possible with constant removal and reinsertion of disposable probe covers. In the event a probe cover is accidentally not applied and a patient is contacted, the probe could be reinserted back into the thermometer housing, thereby contaminating both the probe and the thermometer housing. Subsequent replacement of the probe will not alleviate this situation because each new probe will then become contaminated upon insertion into the holder. In addition, moisture and debris may attach itself to the probe and eventually fall off and accumulate in the well or holder. This accumulation can become a growth medium for infectious matter.

Previous attempts at solving the above-noted problem, such as described in U.S. Pat. No. 4,008,614 to Turner et al., among others, have resulted in removable probe units that can be separated from the remainder of the thermometer housing. However, in each of these instances, contaminants can still enter the thermometry unit itself. Presently, there are no effective seals provided in a thermometry unit to prevent contamination.

SUMMARY OF THE INVENTION

It is a primary object of the present invention to avoid the above-noted problems that are found in the prior art.

It is a further primary object of the present invention to eliminate or substantially minimize cross-contamination which can occur between patients using a thermometry apparatus.

Therefore and according to a preferred aspect of the invention, there is provided a probe receiving chamber for a temperature measuring apparatus, said apparatus including a temperature probe having at least one temperature responsive element connected to a housing, said probe being insertable into a body site of a patient to determine temperature thereof, said probe receiving chamber including a cavity sized for receiving said probe wherein said probe chamber is releasably attachable to said housing and is wholly enclosed so as to provide a fluid-tight seal when attached to said housing.

Preferably, the probe receiving chamber is made from materials which permits the chamber to be cleaned and/or replaced separately without having to replace the thermometry unit.

In addition, the probe receiving chamber also preferably includes means for automatically engaging at least one switch of the thermometry unit when a probe is removed from or placed into the housing so as to activate or shutdown the thermometry unit. According to one embodiment, the probe engages a deformable member provided within the probe receiving chamber which expands outwardly when engaged by the probe and sets the switch. According to another embodiment, an electrical or optical connection is disrupted based on the presence or removal of the probe from the probe receiving chamber as installed in the thermometer housing.

In accordance with another preferred aspect of the present invention, there is provided a thermometry apparatus used for measuring the temperature of a patient, said apparatus comprising:

a housing; and an elongate temperature sensitive probe;

said housing further including a chamber releasably attachable to a receiving port of said housing sized for retaining said temperature sensitive probe, said chamber providing a fluid-tight seal relative to the remainder of the interior of said housing.

Preferably, a switch is disposed within the interior of the housing of the apparatus which is exterior to the probe receiving chamber, the apparatus further including means provided in the probe receiving chamber for automatically engaging said switch when a probe is one of added and removed from said chamber.

The switch can be mechanical in design or assume other forms. For example and according to another preferred embodiment, the switch can be opened and closed electrically or optically such as by breaking a light path between an emitter and detector.

In a preferred version, the switch engaging means includes a protruding interior member disposed within said chamber, said protruding interior member being sized to engage said probe when said probe is inserted into said chamber wherein at least a portion of said chamber is made from a flexible material such that contact with said probe causes elastic deformation of said chamber into engagement with said switch.

An advantage of the present invention is that providing a sealed isolation chamber for the temperature probe substantially reduces or eliminates the risk that contamination resulting from a thermometry probe will spread to the interior of the housing of the thermometry unit.

Another advantage of the present invention is that the probe receiving chamber is removable and can be separately cleaned or disposed of if contamination to the interior of the chamber does occur.

These and other objects, features and advantages will be readily apparent from the following Detailed Description which should be read in conjunction with the accompanying drawings.

BRIEF DESCRIPTION OF THE DRAWINGS

FIGS. 6, 7 and 8 illustrate enlarged partial sectioned views of the thermometry apparatus illustrating the relationship between a thermometry probe and the probe receiving chamber of FIGS. 2–5;

DETAILED DESCRIPTION

Figure 1:
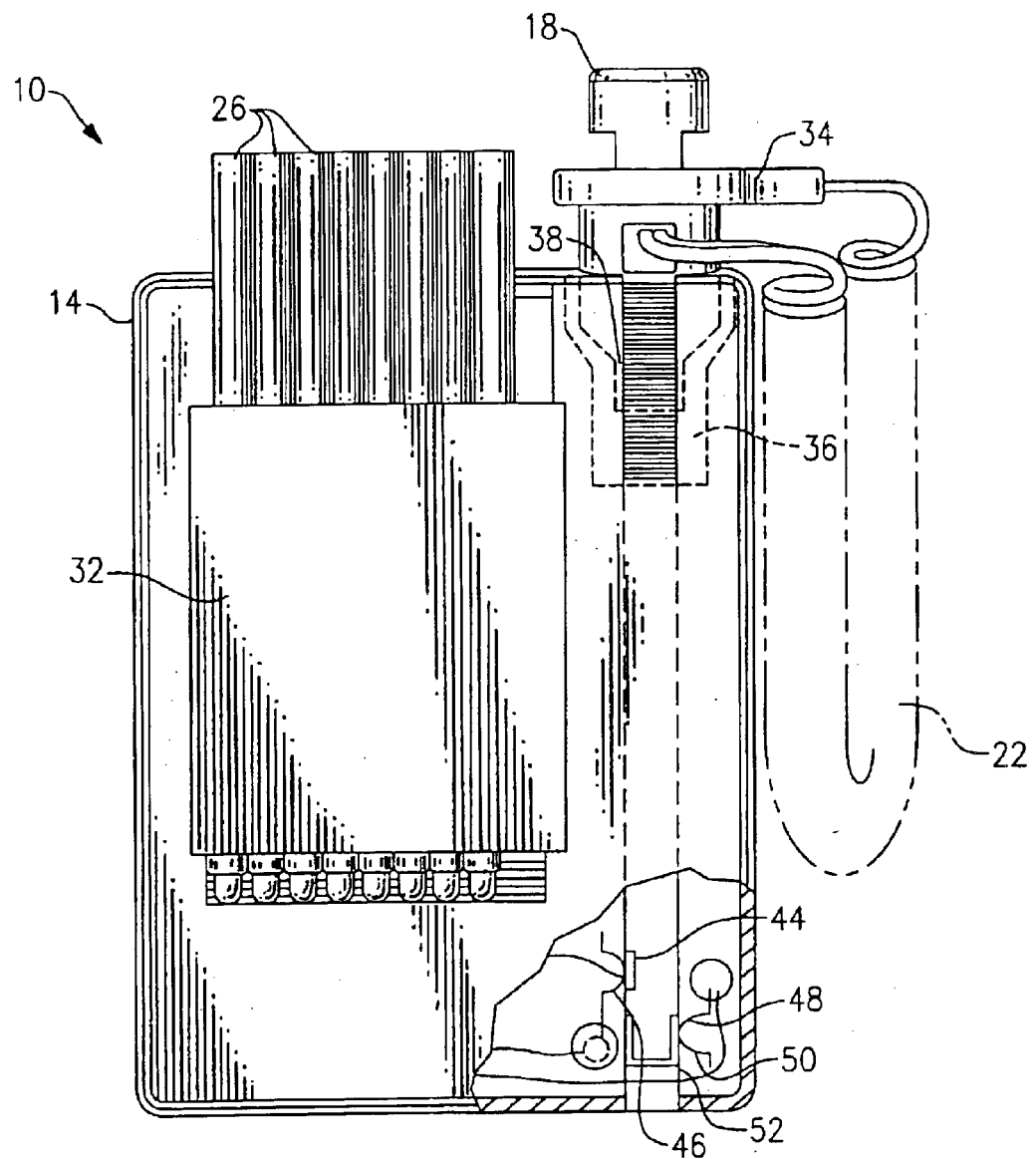
FIG. 1 is a top perspective view of a thermometry apparatus including a probe receptacle made in accordance with the prior art.

The following relates to an apparatus for measuring body temperature of a patient. Prior to discussing the present invention, background is provided by referring to FIG. 1, in which there is shown a prior art thermometry apparatus 10. This known thermometry apparatus is defined by a housing 14 that includes a thermometry probe 18 tethered to the housing by means of a flexible electrical cable 22. The probe 18 is defined by a elongate member which is sized to be fitted into a body site, such as the mouth or rectum of a patient (not shown). The probe 18 is housed within a receiving cavity 38 of a probe receiving chamber 34 provided in a receptacle 36 of the housing 14. Typically, a disposable sheath in the form of a probe cover 26 is placed over the exterior of the elongate portion of the thermometry probe 18 prior to insertion into the body site. A source of thermometry probe covers 32 is provided on the housing 14 or otherwise. The probe 18 further includes a set of contacts 44, 48 that are electrically connected to the flexible electrical cable 22 and are provided near the distal end 52 thereof. The contacts 44, 48 engage a set of resiliently biased contacts 46, 50 provided within the bottom of the probe chamber 34 that are engaged upon when a thermometry probe 18 has been inserted therein, thereby automatically powering down the apparatus 10.

In use, the thermometry probe 18 is removed from the housing 14, opening the contacts 46, 50 and powering the apparatus 10. The probe 18 can then be inserted into an appropriate patient body site (e.g., mouth, rectum, etc.) wherein the temperature of the body site is represented on an instrument display (not shown).

Following use, the probe cover 26 is removed from the probe 18 and the probe is returned into the receiving cavity 36 of chamber 34. Insertion of the probe 18 into the bottom of the probe well completes the circuit, thereby powering down the apparatus 10.

Referring now to FIGS. 2–5, there is shown a thermometry apparatus 60 which is made in accordance with a first embodiment of the present invention. As in the preceding, the apparatus 60 also includes a housing 64 which includes circuitry for processing a signal that is generated by a tethered probe 68 containing at least one temperature responsive element, such as a thermistor, the probe being sized for insertion into a patient body site, such as the sublingual pocket. The probe 68 is releasably connected in a manner commonly known to the instrument housing 64 by means of a flexible electrical cord 66, shown only partially in phantom in FIG. 2. As in the preceding, a disposable probe cover (not shown) can be placed in overlaying relation relative to the exterior of an elongate portion 72 of the probe 68 to avoid contamination wherein a source of covers (not shown) can be provided in a receptacle 70 provided on the rear of the instrument housing 64, the probe further including a handle 77 at an upper end thereof.

The housing 64 includes a user interface 67 on a front facing side that includes a display 65 as well as a plurality of control buttons 69 for controlling operation of the apparatus 60. The apparatus 60 is powered by a set of batteries (not shown) that are contained therein.

Figure 3:
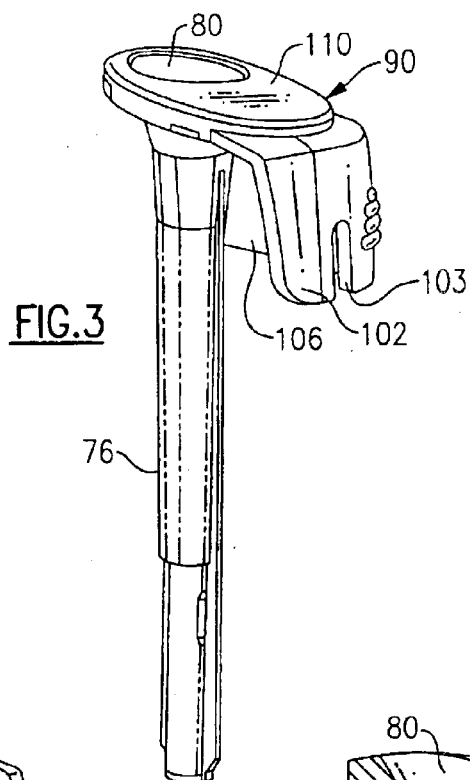
FIG. 3 is the top perspective view of the probe receiving chamber of the apparatus of FIG. 2.
Figure 4:
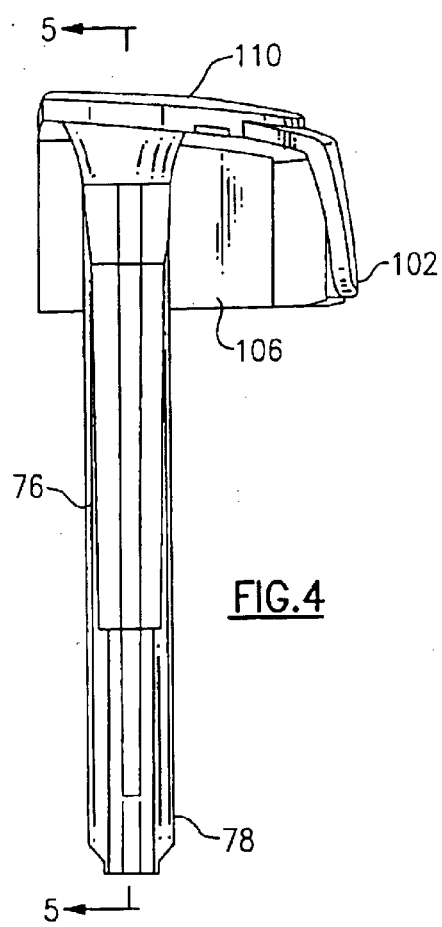
FIG. 4 is a side elevational view of the probe receiving chamber of FIGS. 2 and 3.
Figure 5:
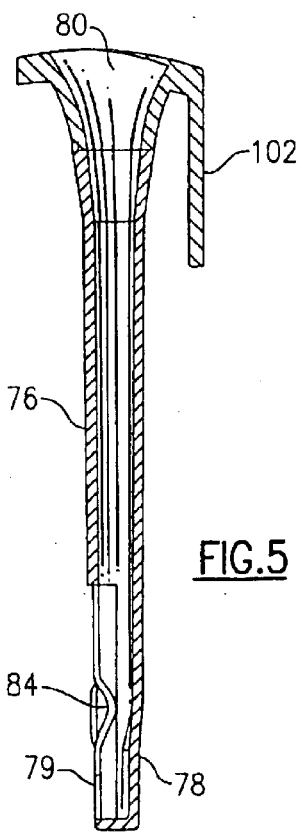
FIG. 5 is a sectioned view of the probe receiving chamber taken through lines 5—5 of FIG. 4.

Referring to FIGS. 3–5, a probe receiving chamber 74 in accordance with the first embodiment invention is releasably attachable to the housing 64 and is fitted into a defined receiving cavity (not shown) thereof. The chamber 74 according to this embodiment is defined by a flexible elongate probe well 76 extending downwardly from an upper section 90, the chamber having a receiving aperture 80 extending therethrough that is appropriately sized for receiving the entirety of the probe 68. This aperture 80 is tapered inwardly so as to receive each of the elongate portion 72 of a probe 68 as well as the upper handle 77. The upper section 90 of the chamber 74 includes a pair of side walls 102, 106 as well as a top wall 110 that forms corresponding portions of the side walls and the top wall of the housing 64 when the chamber 74 is installed into the defined receiving cavity. The side wall 102 includes a slot 103 which permits the cord 66 of the probe 68 to be releasably connected to an electrical port (not shown) provided on the housing 64.

The elongate probe well 76 of the chamber 74 includes an opposing distal end 78 that includes an protruding interior element 84. A flexible wall portion 79 adjacent the protruding interior element 84 of the elongate well 76 is manufactured from a highly elastomeric material, wherein the interior of the probe chamber 74 is wholly isolated from the remainder of the interior of the housing 64, when attached thereto. As such, a fluid-tight seal is formed between the probe receiving chamber 74 and the remainder of the interior of the housing 64.

Referring to FIGS. 6–8, a switch 94 is disposed in relation to a circuit board 98 that enables electrical power for the apparatus 60 when a probe 68 is either inserted or removed from the housing 64. According to this embodiment, the switch 94 is pivotally mounted within the housing 64 so as to assume one of two positions; that is, a first or open position, as shown in FIG. 6, or a second or closed position relative to the circuit board 98, as shown in FIG. 8. In this embodiment, the switch 94 must be in the closed position wherein a contact 96 attached to the circuit board 98 is engaged by a corresponding contact of the switch in order to power the apparatus 60. The protruding interior element 84 of the elongate well 76 is manufactured with a sufficient 100 to permit adequate deformation when engaged upon by the probe 68 to overall height or thickness relative to the diameter of the well and that of the probe 68 induce pivoting of the switch 94 between the two positions, as shown most clearly in FIGS. 7 and 8.

In operation, the probe receiving chamber 74 when it is attached to the defined receiving cavity of the housing 64 provides a receptacle for a temperature probe 68. The probe 68 can be removed from the chamber 74 and then used in a conventional manner to measure temperature through insertion in an appropriate body site of a patient. Upon completion, the disposable cover (not shown) is removed from the probe 68 and is discarded and the probe is then placed into the receiving aperture 80 of the chamber 74.

As shown in FIG. 6 and when the thermometry probe 68 is first introduced into the chamber 74, the switch 94 is still set in the closed position with the switch contact enabled against the contact 96 of the circuit board 98. As the distal end of the probe 68 is further engaged with the probe well 76, as shown in FIG. 7, the distal end of the probe engages the interior protruding element 84, causing the element to expand outwardly due to the flexibility of the wall portion 79 of the elongate probe well 76, wherein the expanded tube then engages with the end of the pivotally mounted switch 94. The switch 94, as a result of the above engagement, is caused to pivot as shown by arrow 112 and to open with respect to the printed circuit board 98, as depicted according to FIG. 8, thereby powering down the apparatus 60.

Though the preceding referred specifically to a mechanical switch, other variations are possible embodying the inventive concepts herein.

Figure 9:
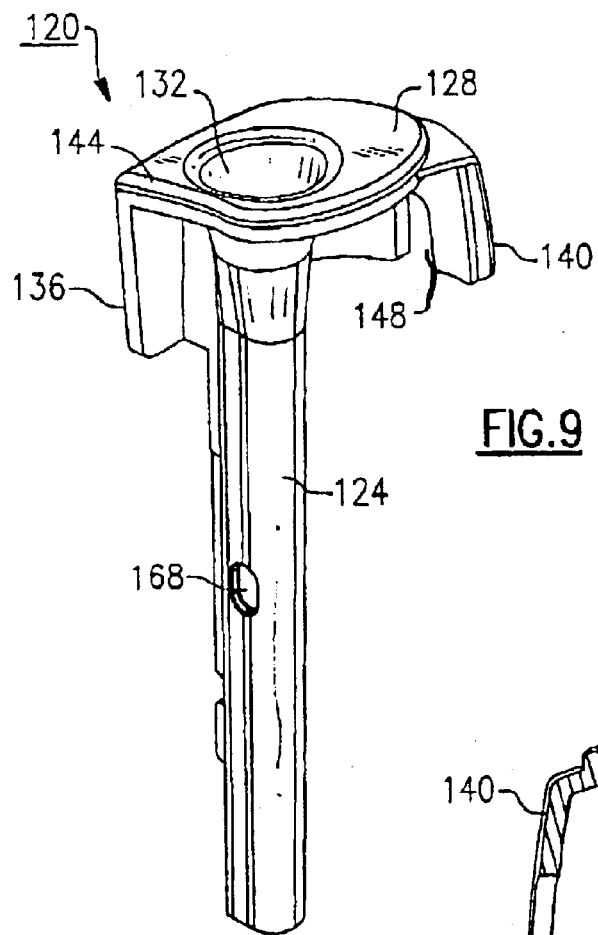
FIG. 9 is a top perspective view of a probe receiving chamber in accordance with another preferred aspect of the invention.
Figure 10:
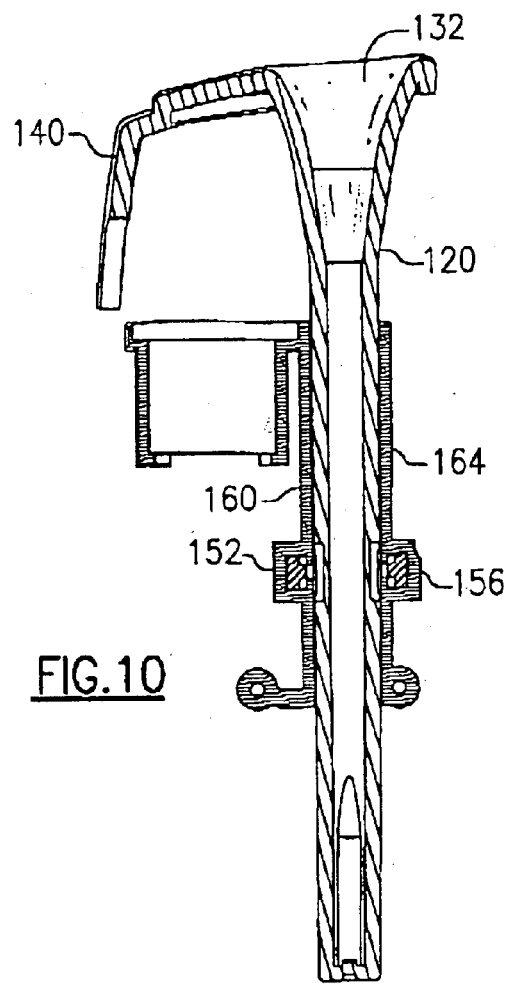
FIG. 10 is a side elevational view, in section, of the probe receiving chamber of FIG. 9.

Referring to FIGS. 9 and 10, a second embodiment of a thermometry apparatus are shown. For purposes of this discussion, the housing and probe configurations are nearly identical except where noted specifically herein. In this instance, a probe chamber 120 similarly includes a flexible elongate probe well 124 extending downwardly from an upper section 128, the chamber having a receiving aperture 132 extending therethrough that is appropriately sized for receiving the entirety of the probe 68, FIG. 2. As in the preceding, the receiving aperture 132 is inwardly tapered so as to receive each of the elongate portion 72, FIG. 2 and the upper portion 77, FIG. 2, of the probe 68, FIG. 2. Similarly, the upper section 128 of the chamber 120 includes a pair of side walls 136, 140 as well as a top wall 144 that when assembled thereto, form corresponding portions of the side walls and the top walls of the housing 64, FIG. 2, when the chamber is installed into the receiving cavity of the housing, the side wall 140 further including a slot 148 which permits the cord 66, FIG. 2, of the probe 68, FIG. 2, to be releasably connected to the housing.

Figure 2:
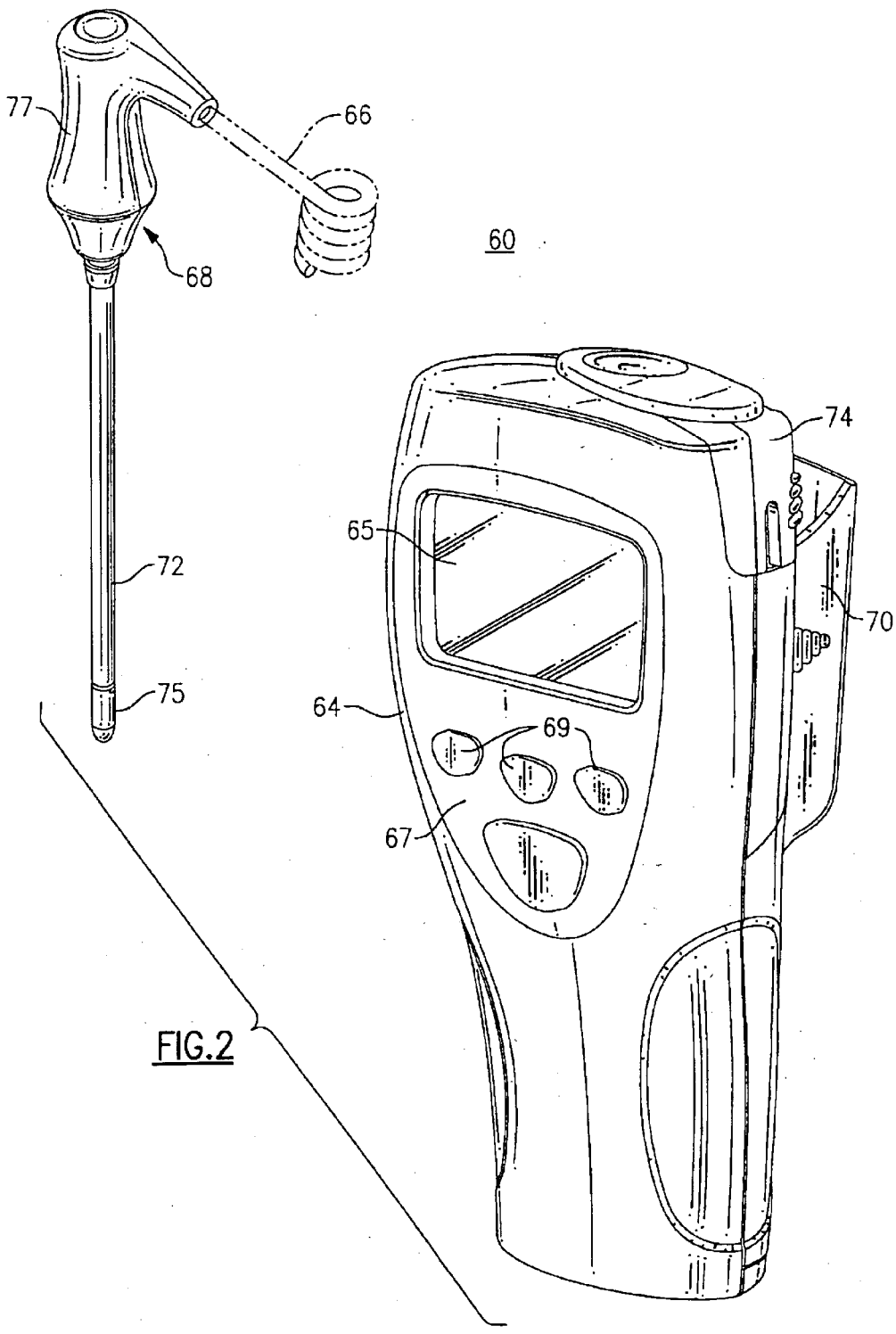
FIG. 2 is a top perspective view of a thermometry apparatus having an isolated probe chamber in accordance with a preferred aspect of the present invention.

Furthermore, and as in the preceding embodiment, the interior of the probe chamber 120 is wholly isolated from the remainder of the interior of the housing 64, FIG. 2, when installed thereto, such that an effective fluid-tight seal is formed therebetween.

In this embodiment and rather than including a mechanical pivoting switch, the housing of this apparatus includes an emitter 152 and a detector 156 that are mounted on respective walls 160, 164 of the receiving chamber of the thermometer housing. The emitter 152 and detector 156 are arranged oppositely to one another across the receiving chamber and face one another at a predetermined intermediate height and are connected electrically by conventional means. Preferably, the emitter 152 includes an IR diode or LED that transmits infrared light which can be detected by the detector 156 in the form of at least one photodetector.

Preferably, the entirety of the flexible probe well is made from an IR transmissive or IR transparent material. According to this embodiment, windows 168 are provided which are thinned areas of the same transparent material located such that the windows will index with the detector 156 and emitter 152 when placed in the receiving cavity of the housing.

In use, the sealed probe chamber 120 is inserted into the receiving cavity of the housing wherein the light path between the detector 156 and emitter 152 is not disturbed due to its transmissive nature until a probe 68, FIG. 2, breaks the contact of the IR light beam and therefore closes a switch which is electrically connected to automatically power down the unit. Likewise, removal of the probe 68 from the well 128 causes the detector 156 to receive light from the emitter 152 and automatically powers up the unit.

The probe chamber 74 is releasably attachable to the housing 64 in order to permit cleaning or sterilizing thereof wherein at least a portion of the chamber can be fabricated so as to be disposable. Preferably, the interior of the probe well 76 is also coated with or otherwise manufactured with an anti-microbial coating.

PARTS LIST FOR FIGS. 1–10

10 apparatus
14 housing
18 thermometry probe
22 flexible tether cord
26 probe cover
32 prove cover source
34 probe receiving chamber
36 receptacle
38 receiving cavity
42 switch
44 contact
46 contact
48 contact
50 contact
60 thermometry apparatus
64 housing
65 display
66 cord
67 user interface
68 probe
69 actuable buttons
70 receptacle
72 elongate portion
74 probe chamber
75 distal end
76 elongate probe well
77 handle
78 distal end
79 flexible wall
80 receiving aperture
84 interior protruding element
90 upper section
94 switch
96 contact
98 circuit board
100 spacing
102 side wall
106 side wall
110 top wall
112 arrow
120 probe chamber
124 elongate probe well
128 upper section
132 receiving aperture
136 side wall
140 side wall
144 top wall
148 slot
152 emitter
156 detector
160 wall
164 wall
168 windows Though the invention has been described in terms of specific embodiments, it should be readily apparent that variants and modifications are possible within the intended scope of the invention. For example and though a pivoting switch is described in the exemplary embodiment, other functional arrangements between the sealed probe chamber and other forms of exterior switch(es) could be envisioned.

We claim:

1. A thermometry apparatus used for measuring the temperature of a patient, said apparatus comprising:

a housing;

an elongate temperature sensitive probe;

said housing further including a probe receiving chamber releasably attachable to a receiving port of said housing and having a probe well sized for retaining said temperature sensitive probe when said probe is not in use, said chamber providing a fluid-tight seal relative to the remainder of the interior of said housing and at least one switch disposed in said housing interior and exterior to said probe well wherein said switch includes a light emitter and a light detector, each of said light detector and light emitter being oppositely disposed relative to the receiving port of said housing and forming a connective light path, said probe well being made from a light transmissive material such that only the presence of said probe in said probe well disrupts the connective light path between said emitter and said detector.

2. An apparatus as recited in claim 1, wherein said chamber is disposable.

3. An apparatus as recited in claim 1, wherein the interior of said probe receiving chamber includes an anti-microbial material.

4. An apparatus as recited in claim 1, including windows provided in said probe well and arranged at a location which is along the light connective path when said probe receiving chamber is placed in said housing.

5. An apparatus as recited in claim 1, wherein insertion of said probe into said light connective path causes said apparatus to power down automatically.

6. A method for automatically powering up and powering down a temperature measuring apparatus, said apparatus including a housing having a receiving port sized for receiving a releasable probe receiving chamber and an elongate probe which is releasably retained within a probe well of said probe receiving chamber, said method comprising the steps of:

inserting said probe chamber into said receiving port, said probe well being made of a light transmissive material, said probe well being introduced into a light connective path established by a light emitter and a light detector oppositely disposed within said receiving port; and inserting said probe into said probe well wherein insertion of said probe causes said probe to be introduced into said light connective path and wherein blockage of said light connective path by said probe causes powering down of said apparatus.

7. A method as recited in claim 6, including the step of removing said probe for use in measuring patient temperature in which said removal step causes said light connective path between said light emitter and light detector to be reestablished through said probe well and causes said apparatus to automatically be powered up.

* * * * *